May 26, 1959 — T. D. VERTIN — 2,887,726
METHOD OF MAKING PLASTIC MODELS
Filed April 24, 1956 — 2 Sheets-Sheet 1
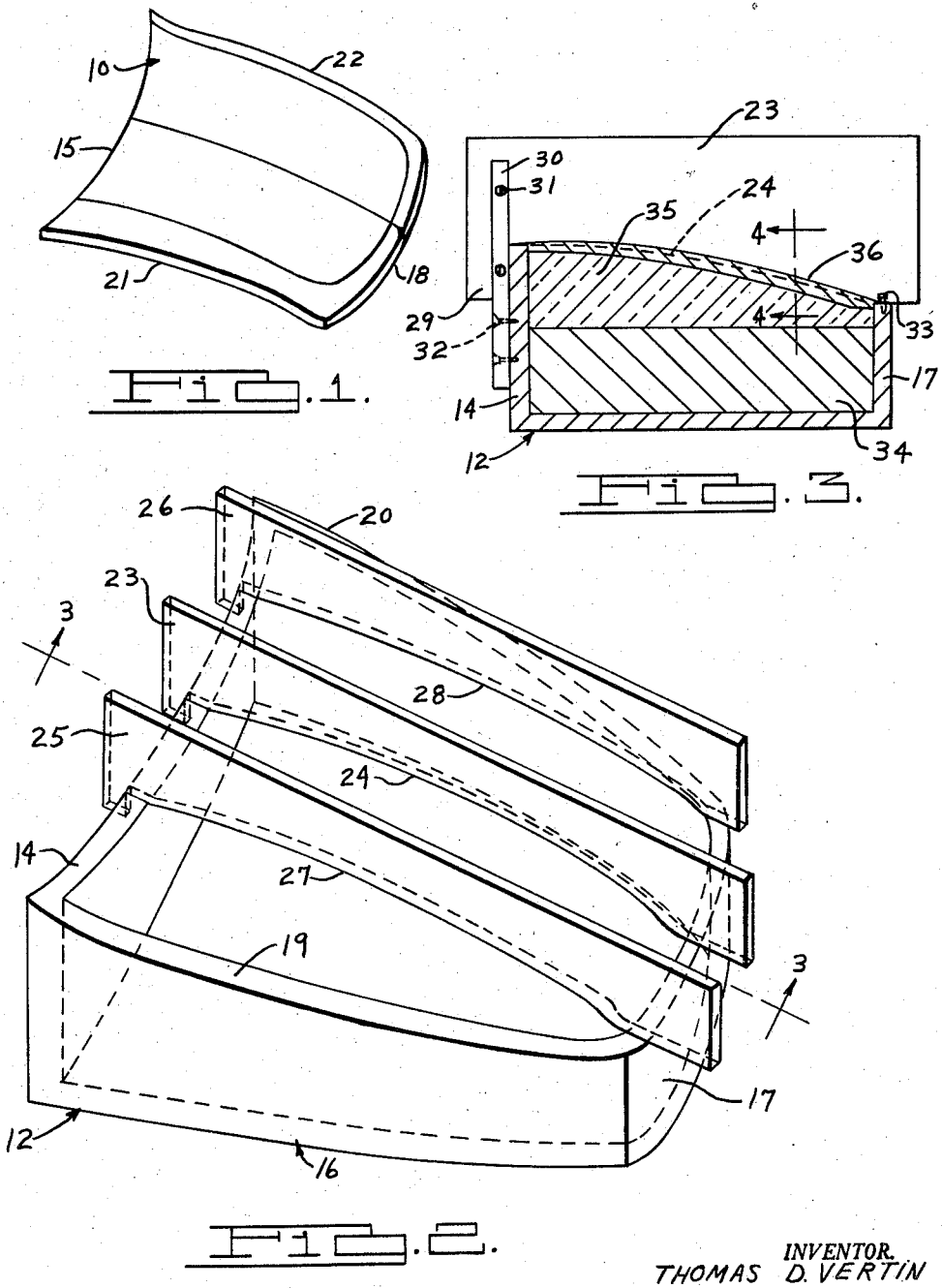
INVENTOR.
THOMAS D. VERTIN
BY Robert D. Mentag
ATTORNEY

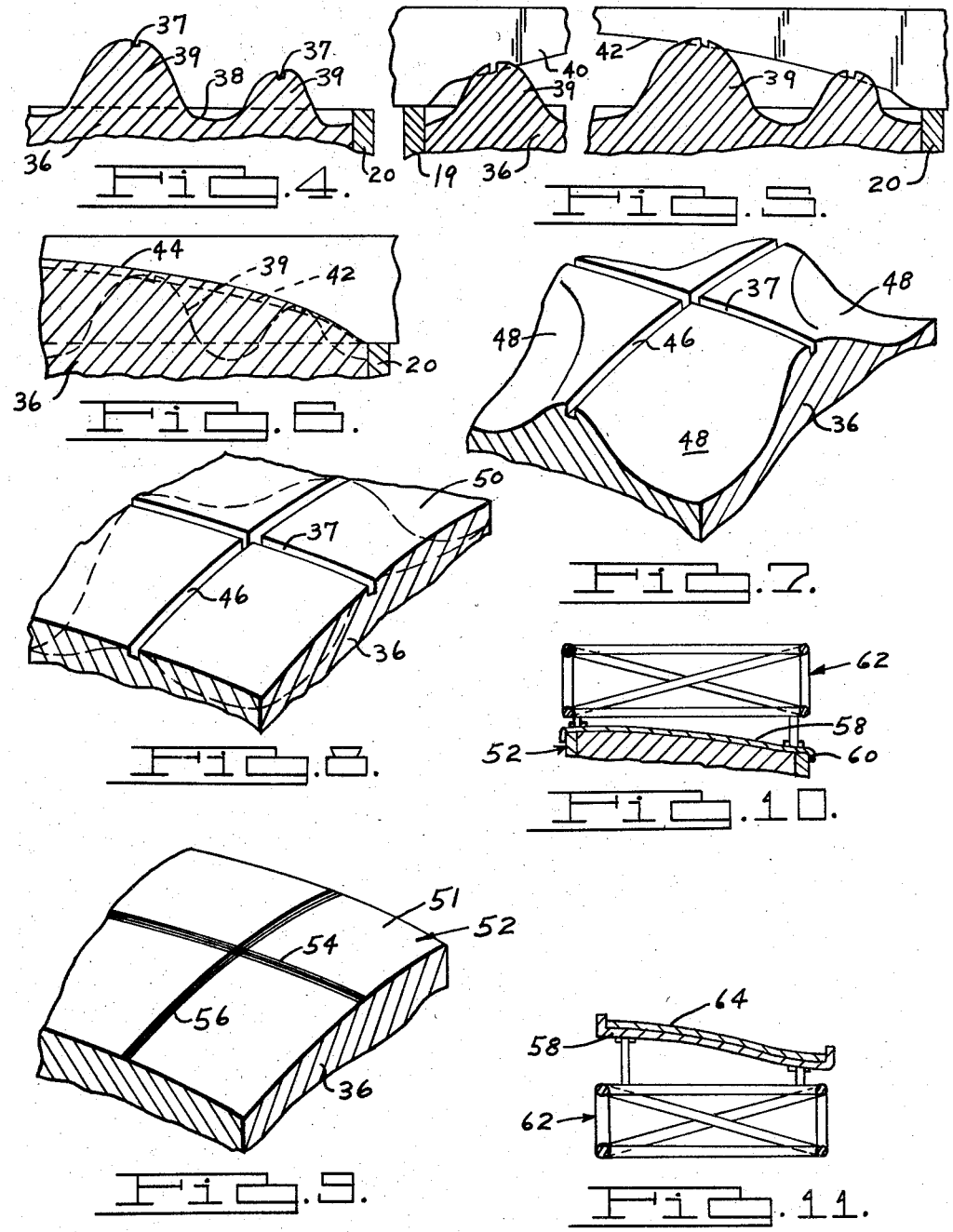

United States Patent Office 2,887,726
Patented May 26, 1959

2,887,726

METHOD OF MAKING PLASTIC MODELS

Thomas D. Vertin, Fraser, Mich.

Application April 24, 1956, Serial No. 580,283

7 Claims. (Cl. 18—55)

This invention relates in general to the art of model making, and, more particularly, to a new and improved method for making plastic models of objects having contoured surfaces.

In many industries, as for example, in the automotive industry, many models of parts having contoured surfaces are used in the designing and production of new products. Such parts include auto body tops, fenders, engine panel hood covers and the like. Heretofore, the making of such contoured models under the prior art methods has proved to be an expensive and time consuming process. Accordingly, it is the primary object of this invention to provide a method for making a plastic model of objects having a contoured surface which may be carried out in an economical and fast manner.

It is another object of this invention to provide a method for making a contoured male model out of a suitable material, as plastic, and/or the like, which includes the step of first making said model from a suitable pliable material, as wax and/or the like.

It is still another object of this invention to provide a method for making a contoured male plastic model having a desired configuration, wherein a box made from wood, or the like, is first provided and which is shaped with a perimeter corresponding to the perimeter of the model to be produced; said box then being filled with a mass or body of pliable material, as wax; the surface of the wax then being shaped to the desired contour, in accordance with a plurality of reference marks or grooves made in the wax, by means of a plurality of contoured templates, whereby, a contoured wax model is thus formed; and then using the wax model to form a female plastic model therefrom; and, finally, forming the male plastic model from the female plastic model.

Other objects, features and advantages of this invention will be apparent from the following detailed description and appended claims, reference being had to the accompanying drawings forming a part of the specification wherein like reference numerals designate corresponding parts of the several views.

In the drawings:

Fig. 1 is a perspective view of a plastic model of an automobile engine panel hood cover made in accordance with the principles of the present invention;

Fig. 2 is a perspective view of an illustrative means for making a plastic male model of the panel hood shown in Fig. 1;

Fig. 3 is an elevational sectional view, reduced in size, of the structure illustrated in Fig. 2, and showing the wax applied around the contoured edge of a template;

Fig. 4 is a fragmentary elevational sectional view of the structure illustrated in Fig. 3, taken along the line 4—4 thereof, and showing the female templates removed from the wax;

Fig. 5 is a transverse, broken, elevational sectional view of the wax container of Fig. 2, showing the manner of mounting transverse female templates on the container;

Fig. 6 is a partial, elevational sectional view, similar to that of Fig. 5, showing the wax built-up around a female template for making a transverse reference groove;

Fig. 7 is a partial perspective view, with the wax container walls broken away, showing the surface of the wax model with the longitudinal and transverse reference grooves formed therein;

Fig. 8 is a view similar to that of Fig. 7, showing the wax model built-up to a rough approximation of the desired contour;

Fig. 9 is a view similar to that of Fig. 8, showing the surface of the wax model after it has been shaved down to the finished desired contour;

Fig. 10 is an elevational sectional view of an illustrative means for making a female plastic model from the wax model; and, Fig. 11 is a view similar to that of Fig. 10, showing an illustrative means for making a contoured plastic male model from the female plastic model.

Referring now to the drawings, and more particularly to Figs. 1 and 2, the numeral 10 designates generally the engine panel hood of an automobile which is illustrative of the objects which may be made from plastic by practicing the principles of the present invention. The first step in the present method for making a plastic model of an object is to make a box or container, as generally indicated by the numeral 12. The plastic models made in accordance with the present invention are the first contoured surfaces made from a new design draft or part print. Accordingly, the box 12 is shaped in plan and elevation in conformance with the design requirements.

In the present example, the outline or perimeter of the panel hood is established in the wood box 12 by shaping the walls of the box to the desired contour of the panel. The height of the walls of the box varies around the perimeter in accordance with corresponding elevational changes in the perimeter of the panel hood. That is, the rear wall 14 of the box 12 is curved like the rear edge 15 of the panel hood 10, and the upper edge of the wall 14 is formed a distance from the base 16 of the box equal to the height of the front wall 17 plus the difference in vertical height between the rear edge 15 of the panel hood and the front edge 18 of the panel hood. The front wall 17 of the box is shaped in accordance with the curvature of the front edge 18 of the panel hood. The side walls 19 and 20 are formed in accordance with the curvature of the side edges 21 and 22 of the panel hood. The upper edges of the side walls 21 and 22 would slope from the rear wall 14 towards the front wall 17 in accordance with the sloping contour between the rear edge 15 and the front edge 18 of the panel hood. The rear wall 14 would determine the high line of the model to be contoured and the front wall would determine the low line of the model to be contoured.

The next step in the present invention is to form a plurality of female templates having a contoured edge representing a line on the desired finished contoured surface. The complexity of the surface to be contoured dictates the number of templates to be used. With a fairly simple contour as in the instant panel hood, three longitudinal templates would suffice, namely, a center-line template and two templates for determining the contour mid-way between the center-line template and the sides of the model. As shown in Fig. 2, the center-line template 23 would have a lower contoured surface 24 which would represent the line of desired contour, between the high line of box wall 14 and the low line of box wall 17, along the center-line of the panel hood. The mid-way templates 25 and 26 would be formed with the lower edges 27 and 28, respectively, representing the line of desired contour at their respective positions. Intermediately disposed templates may be used between the aforementioned templates, if desired. The box 12 and the templates may be made from wood or any other suitable material.

As shown in Fig. 3, one end of the templates may be provided with a downwardly extending leg 29 to which is attached a board 30 by means of the screws 31. The board 30 is in turn secured to the box wall 14 by similar screws 32, whereby, that end of the template will be held in place on the box. The other end of the template may be held in place by any suitable means as by a brad nail 33 on each side of the template end resting on the box wall 17.

The lower end of the box 12 is preferably filled with any suitable filler 34, as wood. The space immediately above such filler 34 is preferably filled with foam plastic 35 to a point about an inch or less from the contoured edges of the templates. After mounting the templates in place on the box 12, a pliable material 36, as wax or the like, is applying over the foam plastic and is built-up around the templates so as to imbed the contoured edges thereof. Preferable waxes for this purpose are paraffin and beeswax. Although the wax may be applied by any suitable means and in any suitable manner, it is desirable to apply the wax by means of a hot spray. The contoured edges of the templates are preferably coated with a suitable transferable colored marking medium, as layout ink or the like, whereby, when the wax is built-up around the template edges the marking medium will also mark the contiguous surfaces of the wax.

After the wax 36 has set, the longitudinal templates 23, 25 and 26 are removed, whereby, a plurality of longitudinal grooves 37 will be left in the wax (Fig. 4), and the bottom surfaces of the grooves 37 will be colored by the marking medium, and, said bottom surfaces will be shaped in accordance with the form of the contoured edges of the templates. As shown in Fig. 4, there will be longitudinal valleys as 38 between the longitudinal built-up wax portions 39.

If desired, a plurality of transverse female templates 40 may also be employed, which are provided with a downwardly facing contoured edge as 42, and which are adapted to rest on the box side walls 19 and 20. The templates 40 are similar to the longitudinal templates 23, 25 and 26, in construction, and they function in a similar manner. Each of the templates 40 would have its contoured edge 42 formed differently, since they would indicate the variation in the desired contour across the width of the panel hood. The templates 40 may be used where desired, and in any number. The templates 40 would be suitably fixed on the side walls 19 and 20 by means similar to the means for fixing the longitudinal templates on the box 12.

After the templates 40 have been fixed in place on the box 12, as illustrated in Fig. 5, additional wax is applied in the box and is built-up around the contoured edges 42 of each of the templates 40, as indicated by the numeral 44 in Fig. 6. The contoured template edges 42 may be coated with the colored marking medium in the same manner and for the same purpose as the contoured edges of the longitudinal templates 23, 25, and 26. After the wax has set, the female transverse templates 40 are removed, whereby, a plurality of transverse grooves 46 will be left in the wax surface, and the bottom surfaces of these grooves will also be colored by the marking medium, and, said bottom surfaces will be shaped in accordance with the form of the contoured templates edges 42. As shown in Fig. 7, the wax is thus formed in the box 12 with a surface having a plurality of transverse and longitudinal grooves or reference points, or impressions, formed therein, at pre-determined spaced apart positions in the wax. The voids 48 between the transverse and longitudinal built-up portions in the wax are then filled in, to a level as shown in Fig. 8. It will be seen that the filling action is continued until the wax surface 50 is formed to rough approximation of the desired contour. The number of transverse templates and longitudinal templates employed would depend on the complexity of the contour to be formed in the wax.

After the templates have been removed from the box 12, the excess wax, extending upwardly above the level of the colored bottom surfaces of the grooves, 37 and 46, is removed. The removal of the excess wax may be accomplished by any suitable means, as by a paring or cutting instrument. The wax is scraped or cut down to a depth equivalent to the distance of the colored bottom surfaces of the grooves 37 and 46 from the outer unfinished wax surface of the body of wax 36. The wax area between the colored bottom surfaces of these grooves is scraped to provide a smooth or fair surface 51, therebetween. When all the areas between the grooves are scraped to a smooth surface, the result will be a contoured wax male model 52 having the desired contour thereon. In Fig. 9, the colored bottom surfaces of the grooves 37 and 46 are designated by the numerals 54 and 56, respectively.

After the wax scraping or removing step is completed, the plastic female model 58 is formed by applying a plastic laminate over the wax model surface to any desired depth, as for example to a depth of ¼ inch. A suitable plastic for this step is one known as epoxy, and this plastic sets at room temperature. The female model 58 may be formed with flanges as 60 around the perimeter thereof, and be attached by any suitable means to a tubular supporting framework at 62, as shown in Fig. 10.

In order to form the male plastic model, the procedure for forming the female plastic model is reversed. As shown in Fig. 11, the male plastic model is formed by applying a plastic laminate over the surface of the female model to any desired depth. The same plastic is used as is used for the female model. The result is the provision of a contoured male plastic model of the panel hood of Fig. 1, and which is lightweight and pleasing in appearance.

While it will be apparent that the illustrative embodiments of the invention disclosed are well calculated to fulfill the objects above stated, it will be appreciated, that the invention is susceptible to modification, variation and change without departing from the proper scope or fair meaning of the subjoined claims.

What I claim is:

1. The method of making a contoured master plastic model from the design drafts thereof comprising the steps of making a box with an open upper end, and shaping the outline of the walls of the box to form a perimeter corresponding to the perimeter of the model shown in the design drafts, and shaping the upper edges of the box walls to correspond in relative vertical displacement to the relative vertical displacement of the perimeter of the model shown in the design drafts, making a plurality of templates from the design drafts with the lower edges thereof contoured in reverse form to the design drafts and corresponding to a plurality of laterally spaced lines interconnecting a pair of opposite sides of the perimeter of the model to be made, mounting the templates across the upper open end of the box in laterally spaced apart positions corresponding to the design drafts and with the contoured edges thereof facing downwardly, filling the box with filler means up to a point within one inch from the contoured edges of the templates, depositing a pliable material on top of said filler means along each of said templates to a height sufficient to imbed the lower contoured edges of the templates in the pliable material, removing the templates, whereby, a plurality of grooves shaped in accordance with the contour of the templates are left in the pliable material extending across the box, filling the spaces in the box between the grooves with additional pliable material to a height for providing a smooth interconnecting surface between the bottom contoured surfaces of each of the grooves, removing the excess pliable material down to the bottom surfaces of the grooves and to the extent necessary between the grooves to form a finished smooth surface therebetween, whereby, a male pattern of pliable material of the desired contour is formed, casting plastic material against the finished surface of said male pattern to produce a plastic female mold, and, then casting plastic material against the plastic female mold to produce the master plastic model.

2. The method for making a contoured master plastic model as defined in claim 1, including forming laterally spaced grooves in the pliable material on an axis at right angles to said first named grooves before removing the excess material, in the same manner as followed in the forming of said first named grooves.

3. The method for making a contoured master plastic model as defined in claim 1, including the step of applying a transferable colored marking medium to the contoured edges of the templates before they are mounted in their respective positions on the box.

4. The method for making a contoured master plastic model as defined in claim 1, wherein the plastic material comprises a plastic laminate.

5. The method of making a contoured wax male pattern for use in making a contoured master plastic model comprising the steps of making an open end container having walls shaped to correspond in plan and elevation to the perimeter of the design drafts of said model, making a plurality of transverse templates from the design drafts of the model and with the lower edges thereof contoured in reverse form to the design drafts and corresponding to a plurality of laterally spaced transverse lines interconnecting a pair of opposite sides of the perimeter of the model to be made, mounting the templates across the upper open end of the container in laterally spaced apart positions corresponding to the design drafts and with the contoured edges thereof facing downwardly, filling the container with filler means up to a point within one inch from the contoured edges of the templates, depositing a wax material on top of said filler means along each of said templates to a height sufficient to imbed the lower edges of the templates in the wax material, removing the templates, whereby, a plurality of grooves shaped in accordance with the contour of the templates are left in the wax material extending across the container, filling the spaces in the container between the grooves with additional wax material to a height for providing a smooth interconnecting surface between the bottom contoured surfaces of each of the grooves, removing the excess wax material down to the bottom surfaces of the grooves and to the extent necessary between the grooves to form a finished smooth surface therebetween, whereby, a male pattern of wax material is formed in accordance with the design drafts of the model.

6. The method for making a contoured wax male pattern as defined in claim 5, including the steps of making a plurality of longitudinal templates in the same manner as followed in the making of the transverse templates and forming longitudinal grooves in the wax material in the same manner as followed in the forming of said first named grooves.

7. The method for making a contoured wax male pattern as defined in claim 5, including the step of applying a transferable colored marking medium to the contoured edges of the templates before they are mounted in their respective positions on the container.

References Cited in the file of this patent
UNITED STATES PATENTS

| | | |
|---|---|---|
| 2,652,595 | Kish | Sept. 22, 1953 |
| 2,755,510 | Rauter | July 24, 1956 |